United States Patent
Lev

(10) Patent No.: US 11,295,120 B2
(45) Date of Patent: Apr. 5, 2022

(54) HAND GESTURE HABIT FORMING

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 59 days.

(21) Appl. No.: 16/867,651

(22) Filed: May 6, 2020

(65) Prior Publication Data

US 2021/0350119 A1 Nov. 11, 2021

(51) Int. Cl.
*G06K 9/00* (2006.01)
*G06T 7/73* (2017.01)

(52) U.S. Cl.
CPC ..... *G06K 9/00355* (2013.01); *G06K 9/00248* (2013.01); *G06K 9/00375* (2013.01); *G06T 7/74* (2017.01); *G06T 2207/30201* (2013.01)

(58) Field of Classification Search
CPC ........... G06K 9/00335; G06K 9/00375; G06K 9/00389
See application file for complete search history.

(56) References Cited

U.S. PATENT DOCUMENTS 6,256,400 B1 * 7/2001 Takata ............... G06K 9/00335
379/52

OTHER PUBLICATIONS

Em, "How YOU Can Use Computer Vision to Avoid Touching Your Face" Apr. 2, 2020 (Year: 2020).*

* cited by examiner

*Primary Examiner* — Mark Roz

(57) ABSTRACT

A method of adapting a display comprises receiving a sequence of a plurality of facial images of a face of at least one user located in front of a display; analyzing the plurality of facial images to detect a hand to face gesture of the user; and updating, according to the hand to face gesture, a dataset documenting a plurality of facial touch event frequencies of a plurality of facial touch events in a plurality of facial locations. Each of the plurality of facial touch events is prompted by one of a plurality of previously captured hand to face gestures of the user. The method further comprises, based on the plurality of facial touch event frequencies, generating a presentation on the display. In response to detection of an impending facial touch, a destruction event may be depicted. A presentation may be also generated showing scoring of multiple persons.

14 Claims, 13 Drawing Sheets
(8 of 13 Drawing Sheet(s) Filed in Color)

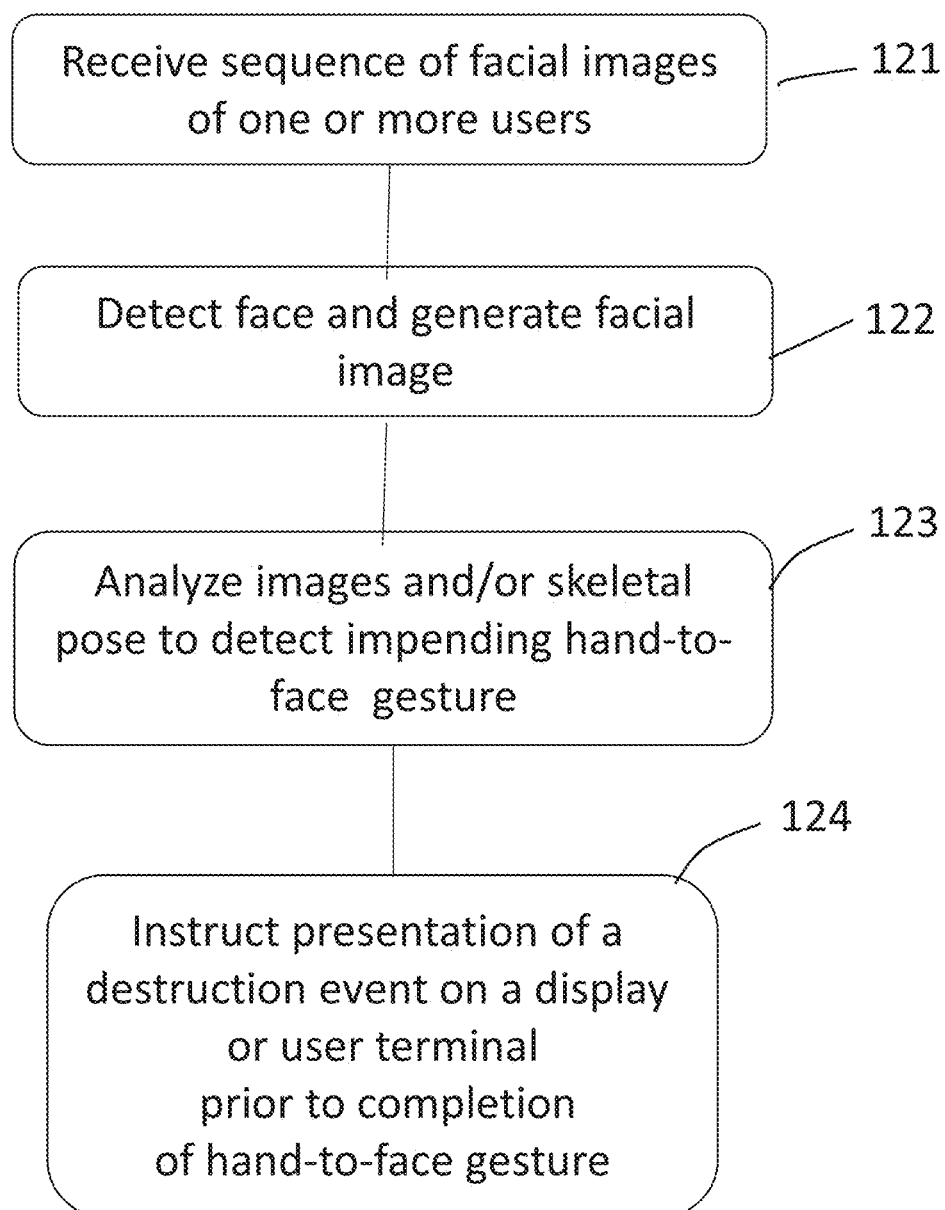

HAND GESTURE HABIT FORMING

FIELD AND BACKGROUND OF THE INVENTION

The present invention, in some embodiments, relates to a system and method for teaching people to refrain from touching their faces, and more specifically, but not exclusively, to a method for adapting a display to generate a presentation about facial touch frequency and/or warning users about an impending facial touch.

Various communicable diseases, such as COVID-19, are introduced to the body via a person's hands, a process known as self-inoculation. Self-inoculation is a type of contact transmission by which a person's contaminated hands make subsequent contact with other body sites on him- or herself and introduces contaminated material to those sites. For example, the person may touch a surface or item that had been previously touched by someone who was infected by the communicable disease. In such instances, if the person touches his mouth or nose with the contaminated hands, the user may infect himself with the communicable disease. In such situations, if the person had washed his hands before touching his face, the person would have avoided being infected with the communicable disease.

The average person touches his or her face approximately 23 times an hour, or more than once every three minutes. According to research reported by Kwok et al., *Face Touching: a Frequent Habit that has Implications for Hand Hygiene*, Am J. Infect. Control 2015 February 43(2): 112-4, of these 23 hourly touches, 44% involved contact with a mucous membrane, and 56% involved nonmucosal areas. Of the mucous membrane touches, 36% involved the mouth, 31% involved the nose, 27% involved the eyes, and 6% were a combination of these regions. Thus, on average, a person touches his mouth 4 times an hour, and his nose three times an hour. The average duration of each mouth touching was two seconds, and of each nose touching was one second. Reducing the frequency of facial touches, and in particular touches to the mouth and nose, would thus reduce the frequency of self-inoculation.

Despite the critical importance of reducing the frequency of facial touches, currently known methods for reducing facial touches generally involve some combination of physical reminders and conscious, sometimes contrived, engagement of the hands. For example, popularly disseminated advice for reducing facial touch during the COVID-19 pandemic include: being mindful about one's intention to keep one's away from one's face; posting reminder notes at a person's home or workplace; keeping one's hands busy or holding an object in the hands; using a scented hand soap; clasping one's hands together and placing them on the lap; and wearing gloves. All of these mechanisms require, to one degree or another, significant concentration. It is hard to use these methods to elevate avoidance of facial touching from a conscious goal to a subconscious habit.

Computer and camera-based systems for monitoring activities and encouraging formation of habits are known, for some areas of human behavior. For example, one known system detects and provides feedback regarding frequency of eating. The system monitors a subject engaged in a primary sedentary activity. The system identifies pattern of limited movement, for example, with a camera, motion sensor, or accelerometer, or a combination thereof. This limited movement pattern could indicate that the user is picking up food and consuming it. The system uses the camera to identify the food that is eaten. If the eating is undesired, the system provides feedback to the user.

Systems of this type are of limited utility for detection and providing feedback on facial touches. First, the system is predicated upon the initial detection of a pattern of limited movement. Facial touching, however, may occur even during a period of active movement. The system would thus have no consistent way of predicting when an impending facial touch event would be expected to occur, or of determining that a facial touch event did in fact occur. Furthermore, such systems describe only monitoring a user's activity when a user is facing the camera, and do not detect events that occur when a user's back is to the camera. In addition, such systems would be useful only in providing feedback to individuals attempting to reduce the frequency of their undesired behaviors. The system could not be easily adapted to a group training format. However, a group training format may be more beneficial for inculcating habits compared to an individual training format.

SUMMARY OF THE INVENTION

It is accordingly an object of the present invention to provide a system and method for detecting facial touches and providing feedback to users about facial touches. It is a further object of the present invention to provide a system and method that can detect facial touches even when a user is otherwise engaged in active movement. It is a further object of the present invention to provide a system and method for detecting facial touches even when a user's back is to a camera. It is a further object of the present invention to provide a method for providing feedback about facial touches that is usable in a group training setting.

According to a first aspect, a method of adapting a display is disclosed. The method comprises: receiving a sequence of a plurality of facial images of a face of a user located in front of a display; analyzing the plurality of facial images to detect a hand to face gesture of the user; and updating, according to the hand to face gesture, a dataset documenting a plurality of facial touch event frequencies of a plurality of facial touch events in a plurality of facial locations. Each of the plurality of facial touch events is prompted by one of a plurality of previously captured hand to face gestures of the user. The method further comprises, based on at least some of the plurality of facial touch event frequencies, generating a presentation on the display.

Advantageously, the display provides feedback to users about their prior hand-to-face gestures, thus enabling them to learn about their habits and adjust their habits correspondingly.

In another implementation according to the first aspect, the presentation comprises a heat map mapping the plurality of facial touch event frequencies in a two dimensional space. Advantageously, the user may learn from the heat map which areas of the face he or she is likely to touch, and may correspondingly focus his or her efforts to limit facial touching to the identified areas.

In another implementation according to the first aspect, the presentation includes a ranking of facial touch events based on one or more of location of facial touches on the user's face, duration of facial touch events, part of the user's body that comes into contact with the user's face, or proximity of facial touch events to other activities by the user. The ranking system may help a user prioritize targeting of facial touch events that are deemed more severe. The severity level of each facial touch may be selected based on likelihood of inoculation of a pathogen from that touch.

In another implementation according to the first aspect, the plurality of facial locations comprises at least an eye area, lips area, nose area, and inner ear area. These areas are the areas of the face that are most susceptible to self-inoculation of disease, and thus are the most important areas for a user to learn to avoid touching.

In another implementation according to the first aspect, the hand to face gesture is detected when at least one of the plurality of facial locations is covered by at least one finger of the user. For example, the finger may block a camera's view of one of the facial locations. Advantageously, the method is able to detect and analyze even a minimal facial touch by a single finger.

In another implementation according to the first aspect, the method further comprises continuously detecting the face of the user when a detection score is above a threshold; wherein the hand to face gesture is detected when the detection score is decreased below the threshold. The detection score is used by a computer to determine that the object being imaged is a face, for example, through correspondence of certain elements with predicted facial elements. When the computer determines that the object is a face, it continuously monitors the face. When the face is partially obscured, the camera is no longer able to image all facial elements that make up the facial detection score, and accordingly the facial detection score drops below the threshold. This method is thus able to detect a facial touch based only on visual features of the face, without requiring additional evaluation or equipment.

In another implementation according to the first aspect, the method further comprises continuously detecting a presence of a first and a second facial keypoint in frames of the sequence. The hand to face gesture is detected when a detection of the first facial keypoint stops, while the detection of the second facial keypoint is maintained. Advantageously, the method is able to detect a facial touch base only on visual features of the face, without requiring additional evaluation or equipment.

In another implementation according to the first aspect, the method further comprises applying a skeletal pose estimation to track a hand of the user; wherein the outcome of the skeletal pose estimation is used for detecting the hand to face gesture of the user. Advantageously, the skeletal pose estimation data may be used to detect a hand-to-face gesture when viewing the user from any direction.

In another implementation according to the first aspect, the plurality of facial images are captured by a webcam. The webcam may be embedded in a personal computer or in a mobile device, thereby providing a convenient and unobtrusive system for capturing the facial images and performing the above-described methods.

According to a second aspect, a method of adapting a display is disclosed. The method comprises receiving a sequence of a plurality of facial images of a face of a user located in front of a display; analyzing the plurality of facial images to detect an initiation of a hand to face gesture of a user; and instructing of a presentation of a destruction event on the display in real time, before the user completes the hand to face gesture. The display of the destruction event thus signals to the user not to complete the planned facial touch, and thus trains the user in real time, rather than having the user learn from post-facto analysis.

In another implementation according to the second aspect, the destruction event comprises an indication of a facial location frequently touched by the user. Advantageously, the indication of the facial location further assists the user in identifying the facial location that is about to be touched, and in training to avoid touching that facial location.

According to a third aspect, a method of training a plurality of persons regarding facial touches is disclosed. The method comprises receiving a sequence of a plurality of images of a plurality of faces of a plurality of persons, and analyzing the plurality of images to detect a plurality of hand to face gestures of the plurality of persons. The method further comprises updating, according to the according to the plurality of hand to face gestures, a dataset documenting for each of the plurality of persons a facial touch event frequency of a plurality of facial touch events. Each of the plurality of facial touch events is prompted by one of the plurality of hand to face gestures. The method further comprises, based on the dataset, generating a presentation scoring at least some of the plurality of persons. Advantageously, the method according to the third aspect may be used to train people in a group setting, such as in a classroom. Compared to individual training, the group training may be more efficacious for forming positive habits regarding facial touching.

In another implementation according to the third aspect, the method further comprises forwarding to each of a plurality of client terminals a notification indicative of a respective hand to face gesture in real time. The client terminals may provide an enhanced user experience for each user by providing him or her an individualized accounting of the facial touches. For example, each user terminal may display all of the facial touch data for all users, but may emphasize the facial touch data of the user that is in front of that terminal.

According to a fourth aspect, a system is disclosed. The system includes an image sensor, a display, and a computer. The computer includes processing circuitry configured to receive a sequence of a plurality of facial images of a face of at least one user located in front of the display; analyze the plurality of facial images to detect a hand-to-face gesture of the user; update, according to the hand-to-face gesture, a dataset documenting a plurality of facial touch event frequencies of a plurality of facial touch events in a plurality of facial locations, each of the plurality of facial touch events is prompted by one of a plurality of previously captured hand to face gestures of the user; and based on at least some of the plurality of facial touch event frequencies generate a presentation on the display. Advantageously, the display provides feedback to users about their prior hand-to-face gestures, thus enabling them to learn about their habits and adjust their habits correspondingly.

In another implementation according to the fourth aspect, the system further comprises a plurality of client terminals. Each of the client terminals is associated with one of the at least one users. The processing circuitry is configured to forward to each of a plurality of client terminals a notification indicative of a respective hand to face gesture in real time. The client terminals may provide an enhanced user experience for each user by providing him or her an individualized accounting of the facial touches. For example, each user terminal may display all of the facial touch data for all users, but may emphasize the facial touch data of the user that is in front of that terminal.

In another implementation according to the fourth aspect, the image sensor is configured within a webcam. The webcam may be embedded in a personal computer or in a mobile device, thereby providing a convenient and unobtrusive system for capturing the facial images.

In another implementation according to fourth aspect, the at least one user is a plurality of users, and the presentation comprises a presentation scoring at least some of the plurality of users. The system may be used to train people in a group setting, such as in a classroom. Compared to individual training, the group training may be more efficacious for forming positive habits regarding facial touching.

In another implementation according to the fourth aspect, the processing circuitry is further configured to analyze the plurality of facial images to detect an initiation of a hand to face gesture of a user; and instruct a presentation of a destruction event on the display in real time, before the user completes the hand to face gesture. The display of the destruction event thus signals to the user not to complete the planned facial touch, and thus trains the user in real time, rather than having the user learn from post-facto analysis.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1A is a schematic depiction of a system for detecting and analyzing hand-to-face gestures of a single user, according to embodiments of the invention;

FIG. 1B is a schematic depiction of a system for detecting and analyzing hand-to-face gestures of users in a group, according to embodiments of the invention;

FIG. 2A is a depiction of a flow chart for a method of detecting and displaying information related to hand-to-face gestures, according to embodiments of the invention;

FIG. 2B is a depiction of a flow chart for a method of detecting information related to hand-to-face gestures of multiple users and scoring the users, according to embodiments of the invention;

FIG. 2C is a depiction of a flow chart for a method of detecting an impending hand-to-face gesture and displaying a warning signal prior to completion of the gesture, according to embodiments of the invention;

FIG. 3A is a depiction of facial keypoint detection of an unoccluded face, according to embodiments of the invention;

FIG. 3B is a depiction of a user performing a gesture that, if completed, would partially occlude a face, according to embodiments of the invention;

FIG. 3C is a depiction of a facial keypoint detection of a completely occluded face, according to embodiments of the invention;

FIG. 3D is a depiction of a facial keypoint detection of a partially occluded face, according to embodiments of the invention;

FIG. 4A is a depiction of facial key points of an unoccluded face, according to embodiments of the invention;

FIG. 4B is a depiction of the facial key points of FIG. 4A with partially occluded portions of the face displayed in a different color, according to embodiments of the invention;

Figure 5A:
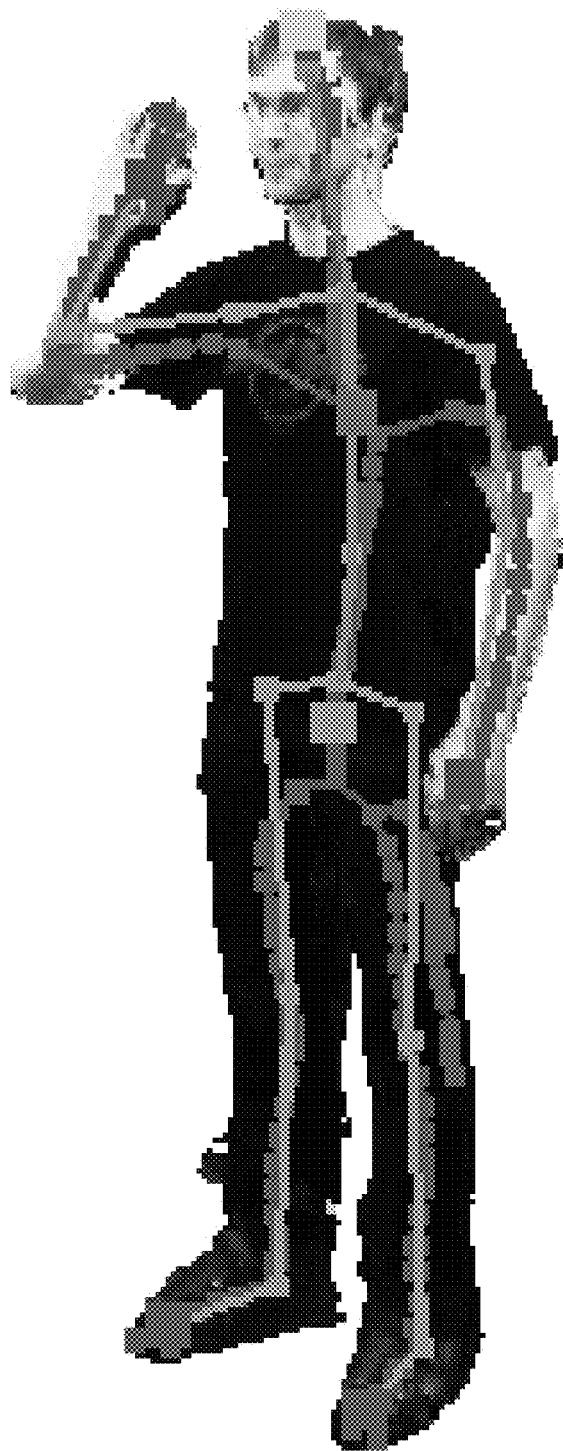
Figure 5B:
Figure 5C:
Figure 6:
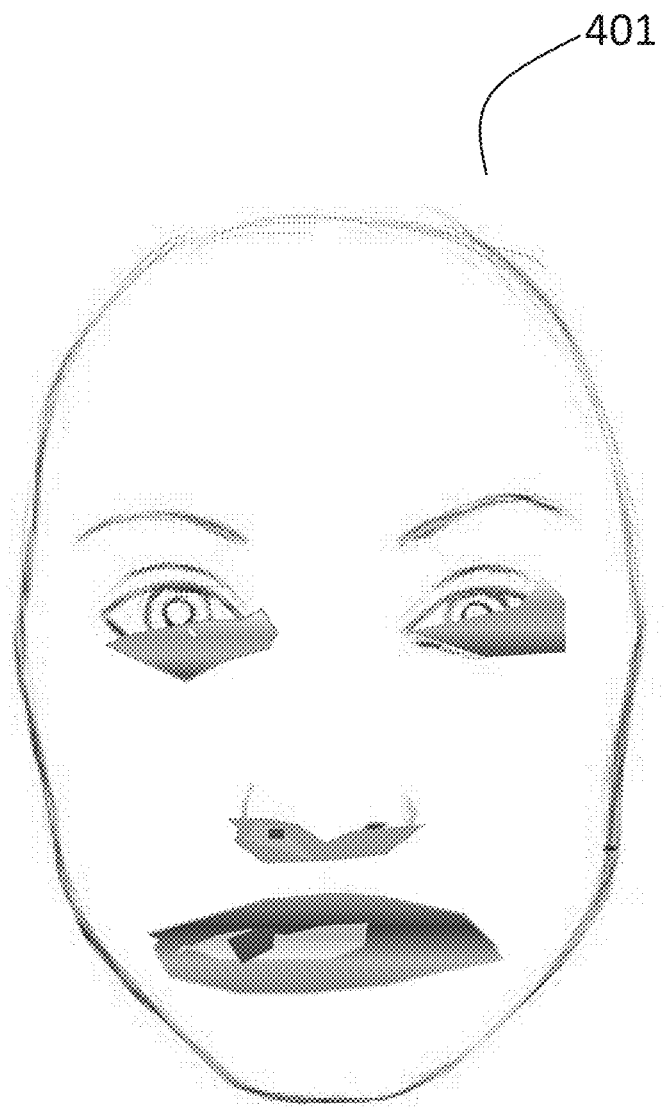
Figure 7:
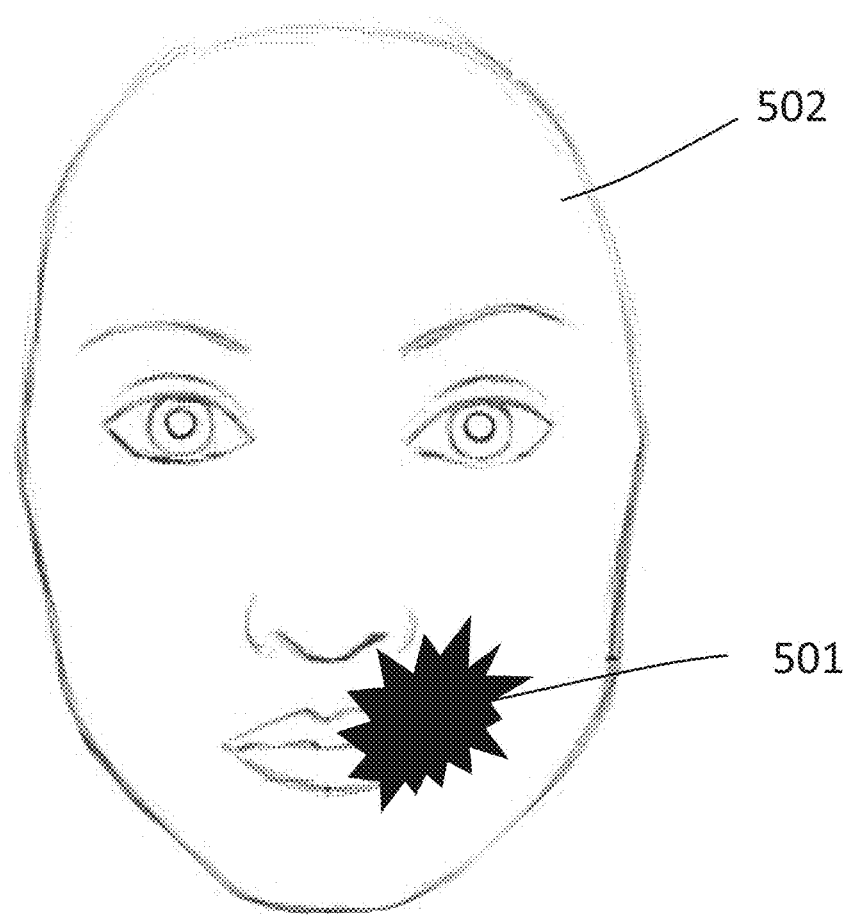

FIG. 5A is a depiction of a skeletal pose estimation, according to embodiments of the invention;

FIG. 5B is a depiction of the skeletal pose estimation of FIG. 5A used to detect a hand-to-face gesture from the front, according to embodiments of the invention;

FIG. 5C is a depiction of the skeletal pose estimation of FIG. 5A used to detect a hand-to-face gesture from the rear, according to embodiments of the invention;

FIG. 6 is a schematic depiction of a heat map showing areas of different facial touch frequencies in different colors, according to embodiments of the invention; and FIG. 7 is a depiction of a destruction event depicted on a display of a face, according to embodiments of the invention.

DESCRIPTION OF SPECIFIC EMBODIMENTS OF THE INVENTION

The present invention, in some embodiments thereof, relates to a system and method for teaching people to refrain from touching their faces, and more specifically, but not exclusively, to a method for adapting a display to generate a presentation about facial touch frequency and/or warning users about an impending facial touch.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1A:
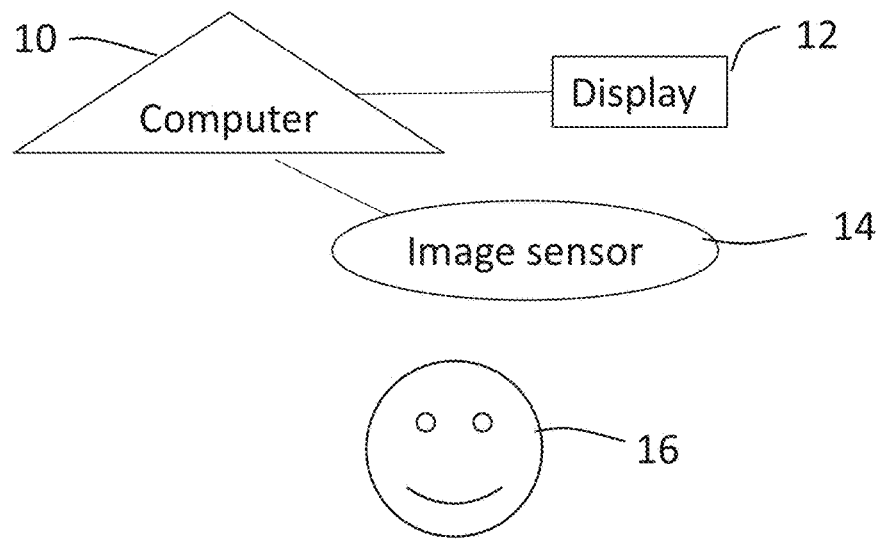

Referring to FIG. 1A, elements of a basic system for adapting a display to advise users about facial touch frequency and/or warn users about an impending facial touch are shown. The system includes computer 10, display 12, and camera 14.

Computer 10 may include a computer readable storage medium (or media) having computer readable program instructions thereon for causing a processor to carry out aspects of the present invention. Computer 10 may be, for example, a desktop computer, a mobile computer, a tablet, or a smartphone.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer 10 is electronically connected to display 12 and image sensor 14. Display 12 may include one or more screens or projected displays suitable for displaying visual content of the type described below.

Image sensor 14 is arranged to image user 16. As used herein, the term "image sensor" encompasses one or more imagers, such as cameras or any type of imaging sensors, including active-pixel sensors (e.g. CMOS sensors and charge-coupled devices (CCDs)), infrared sensors and/or the like. Image sensor 14 may be a webcam, or may otherwise be a camera embedded in another electronic device, such as a mobile phone or a tablet. The images may be captured at a suitable rate for facial recognition and analysis, for example, up to around 60 frames per second. Optionally, image sensor 14 may also capture images in the infrared range. An advantage of capturing images in the infrared range is that it enables detection of facial touches even in poor lighting.

Figure 1B:
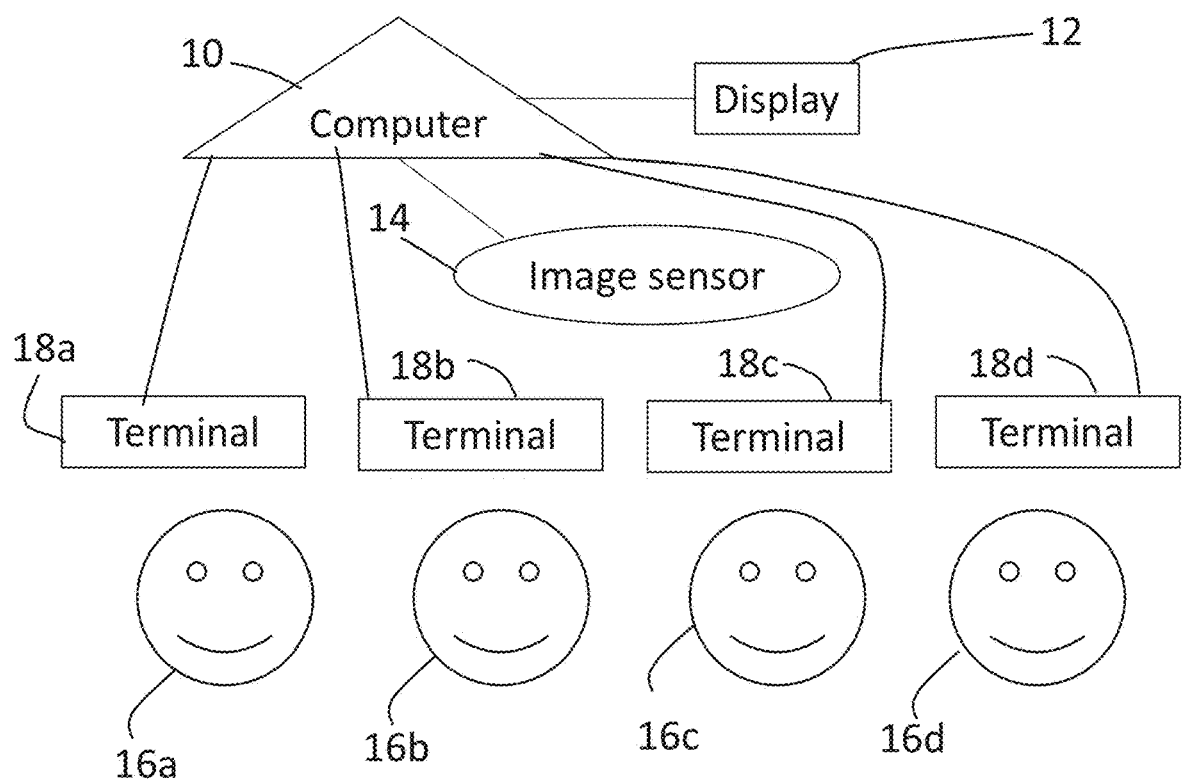

FIG. 1B schematically depicts an exemplary system for detecting and displaying facial touches for a plurality of users in a group, and for training the plurality of users in the group, according to embodiments of the invention. The users in the group may be, for example, classmates in a training session for learning to prevent facial touching. In the illustrated embodiment, there are four users 16a, 16b, 16c, and 16d. This number is arbitrary, and a larger or smaller number of users may be employed, according to user preference.

As depicted in FIG. 1B, a single image sensor 14, connected to a computer 10, is positioned in front of the group of users 16a-d. In such embodiments, the image sensor 14 is positioned to image all the users 16a-d simultaneously.

Optionally, display 12 is positioned in from of the group of users 16a-d. The display 12 may be used to provide feedback to the group of users 16a-d regarding their facial touches. In such embodiments, the display 12 is positioned in such a position such that all users 16a-d may view the display 12 simultaneously. In addition or alternatively, an instructor is present to provide feedback to the group of users 16a-16d.

Also optionally, each user 16a-16d has a terminal 18a-18d placed in front of him or her. Terminals 18a-d are electronically connected to computer 10. The terminal 18a-18d may be used to display an individualized display to each user 16a-d. Each terminal 18 may display a different image than display 12. For example, display 12 may display cumulative data about facial touches by members of the group, whereas each terminal may display data about facial touches by the user sitting in front of it. In one exemplary embodiment, terminal 18a-18d is incorporated in a user's mobile phone, tablet, or computer.

Figure 2A:
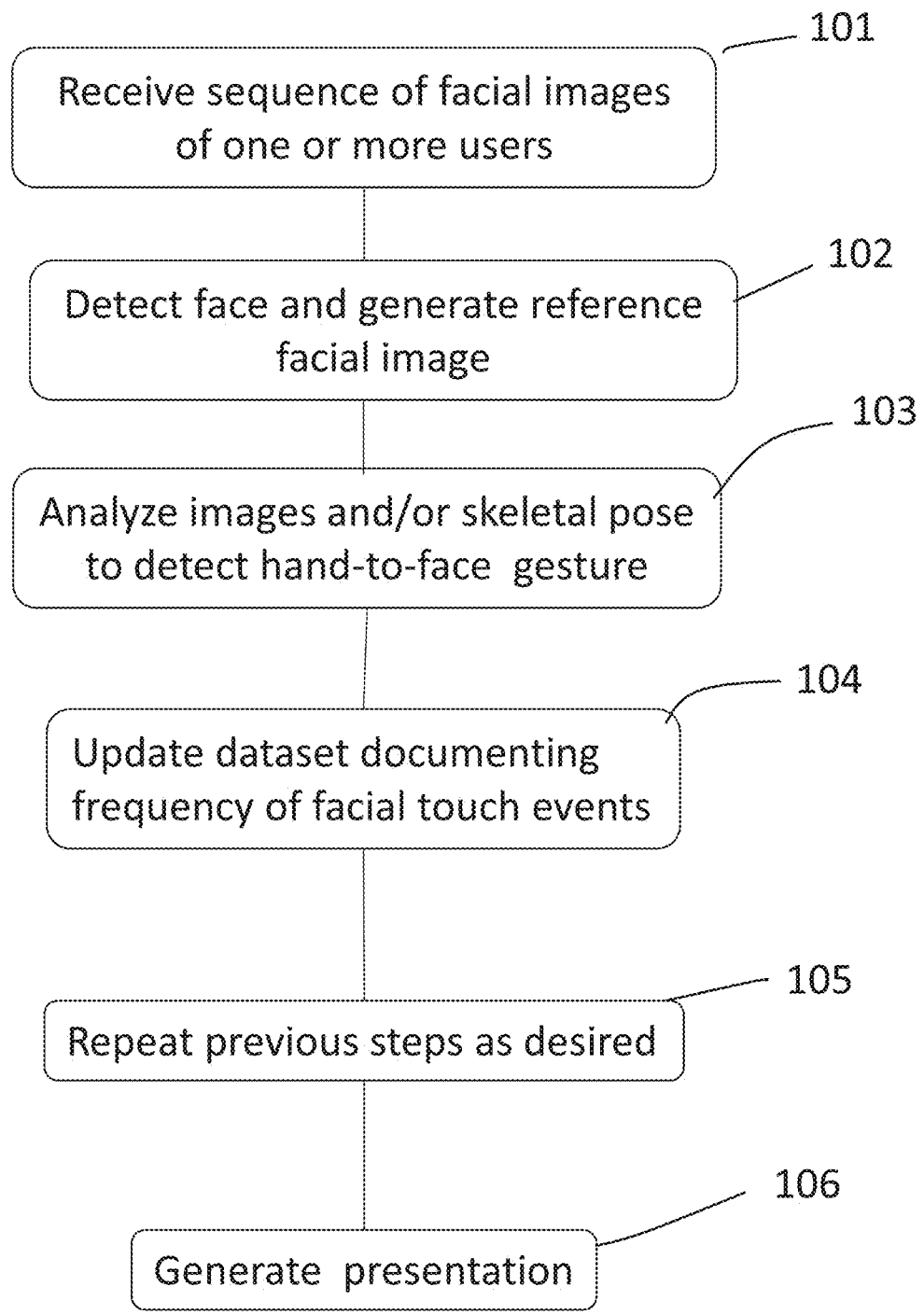
Figure 2B:
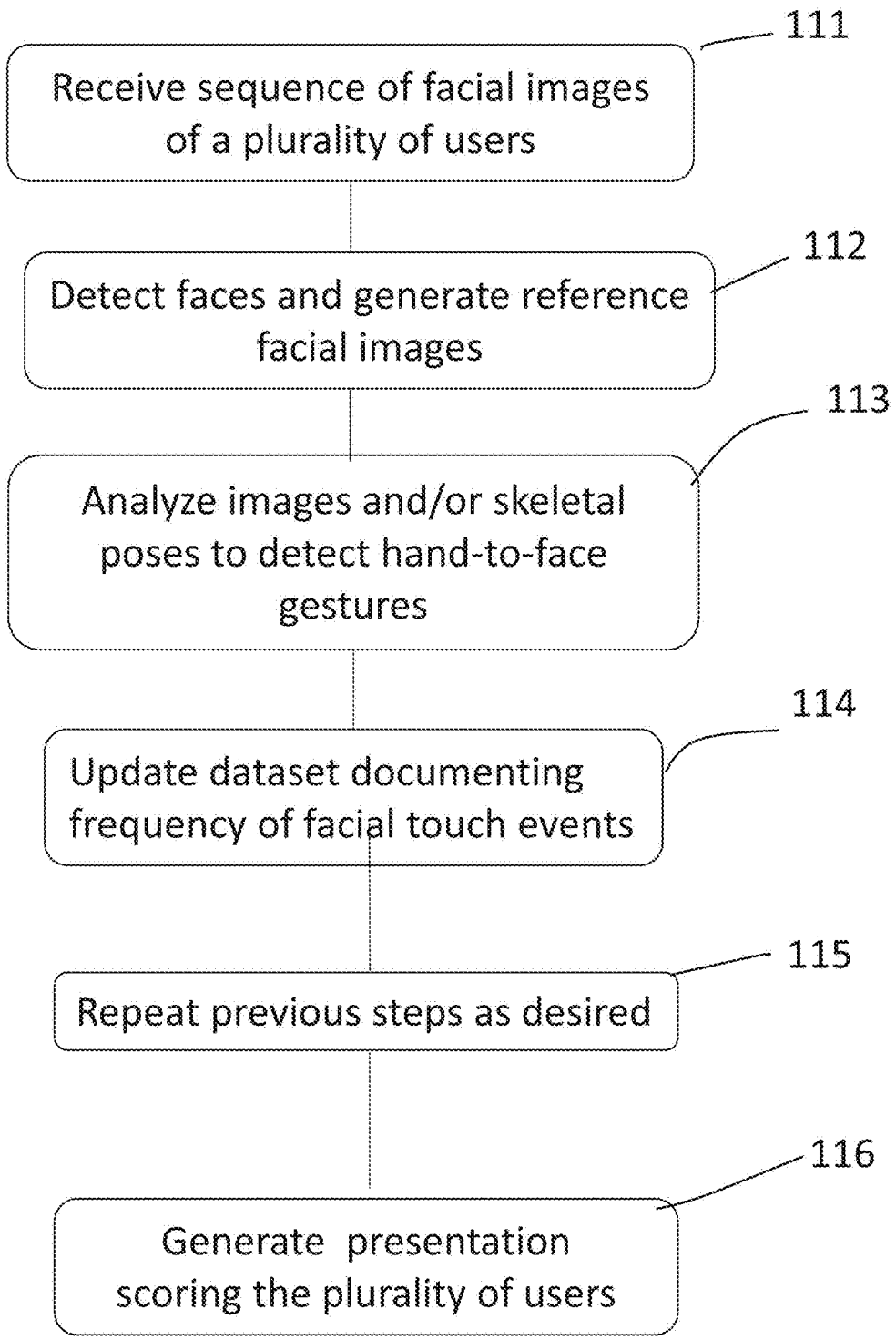

FIGS. 2A-2C depict flow charts for methods of detecting and displaying information related to hand-to-face gestures, according to embodiments of the invention. FIGS. 3A-5C illustrate techniques the computer may use to determine whether a facial touch gesture has occurred. FIGS. 6 and 7 illustrate user-directed displays that may be generated during performance of these methods.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 2A details steps for training an individual user. At step 101, the computer receives a sequence of a plurality of facial images. The facial images are captured by the image sensor. The facial images are the face of a user that is located in front of a display.

At step 102, the computer detects the presence of the user's face and generates a reference image of an un-occluded face. The detection of a face may be performed using any computer-based facial recognition and imaging techniques that are currently known in the art, or that may later become known. For example, the computer may use a detection score system, in which a received image is analyzed to determine whether it contains an image of a face, based on its matching of facial keypoints or facial landmarks. Facial keypoints or landmarks generally specify areas of the nose, eyes, mouth, and other features that are characteristic of a face. This system may detect the presence of a face regardless of attributes such as gender, age, and facial hair. The system may be programmed to identify a certain number of facial key points, for example, sixty eight. The system may further be programmed to assign a detection score to the facial image, based on the percentage of expected facial key points that were detected or mapped on the image. The system may be programmed to identify a face only when the detection score is above a certain percentage confidence, for example, 90% or 99%.

Optionally, the computer may also operate with a face comparison system, which determines whether the detected face matches a face that was previously in front of the camera. The face comparison system increases the ease of using the same computer and image sensor, sequentially, for multiple users. The computer may identify each unique user based on his or her face, without requiring users to input their identities manually.

Figure 3A:
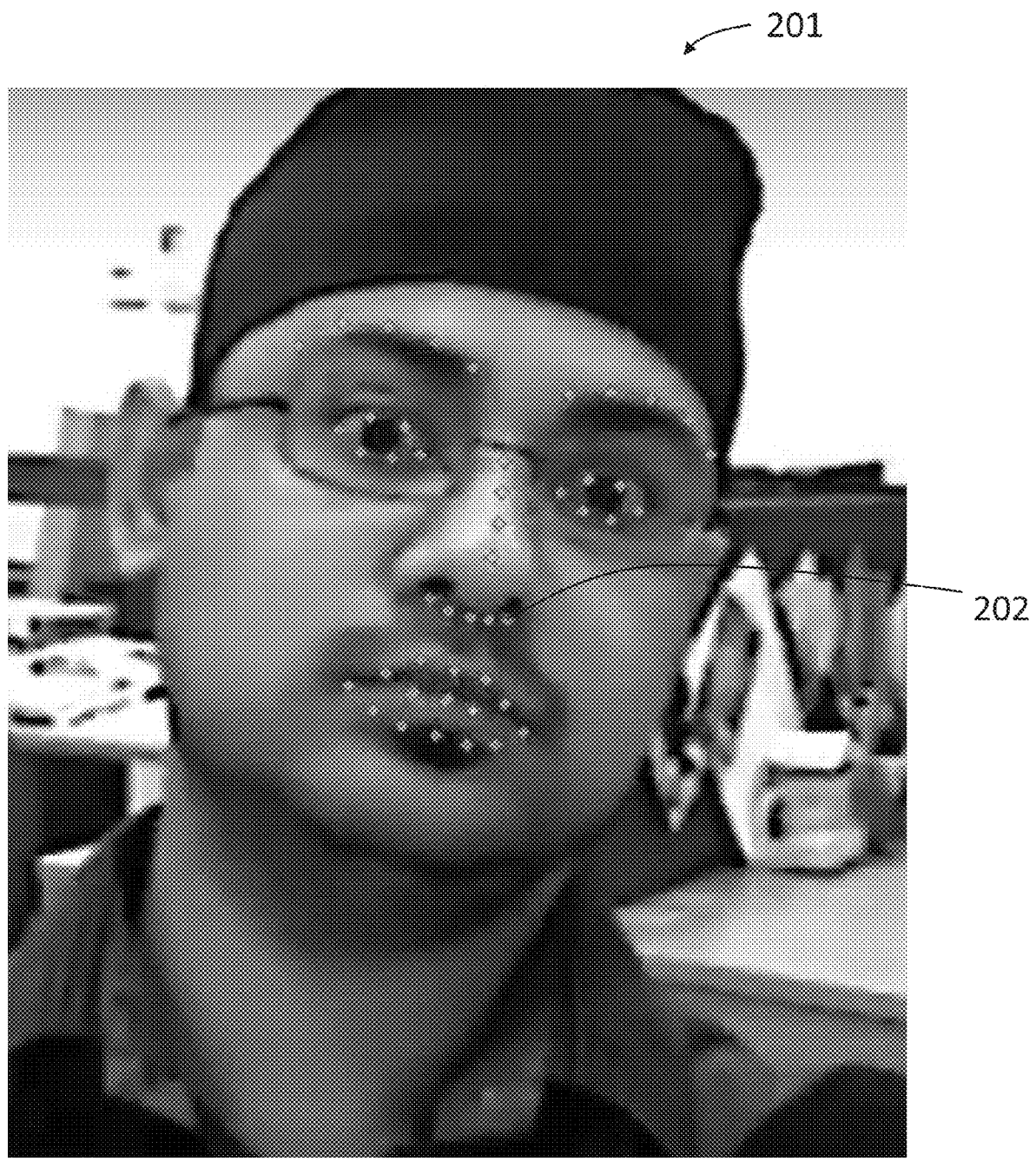

An exemplary reference image 201 is depicted in FIG. 3A. The generated reference image of each user's face may include the locations of the detected facial keypoints 202. The facial keypoints 202 may be mapped or overlaid onto an image of the user's face. In the illustration of FIG. 3A, keypoints 202 associated with the eyes, nose, and mouth are depicted as red dots.

In the course of generating a facial image and detecting facial touches in the manner described herein, the computer may use a deep learning algorithm, and algorithm based on a convolutional neural network (CNN), or any other algorithm known to those of skill in the art.

At step 103, the computer analyzes the facial images to detect a hand-to-face gesture. The computer may identify a hand-to-face gesture through a number of algorithms, or a combination thereof. For example, the computer may continuously monitor facial images of the user, and continuously detects presence of at least a first and a second facial keypoint in frames of a sequence. The computer detects the presence of fingers near the eye, lips, nose, or inner ear area, for example, by comparing the reference image of the un-occluded face with the current face. An occlusion would manifest itself as a partial disappearance or relocation of one or more facial keypoints in the occlusion region, while one or more facial keypoints remains.

Figure 3B:
Figure 3C:
Figure 3D:

One exemplary depiction of a computer analysis of a facial touch is shown in FIGS. 3B-3D. FIG. 3B depicts a user in the process of moving his hand to a facial area. FIG. 3C shows the user covering his entire face—including the eyes, nose, and mouth—with his hand. Facial keypoints 202 of the unoccluded face are overlaid over the image. As can be seen, the user's hand occludes all of the facial keypoints 202. The computer determines that the keypoints 202 are occluded and records that a facial touch has occurred.

FIG. 3D shows the user covering only the left side of his face with his hand. As in FIG. 3C, the facial keypoints 202 of the unoccluded face are overlaid over the image. The facial keypoints 202 on the left side of the face are obscured by the hand, but the facial keypoints 202 at the center and right sides of the face remain unobscured and are detectable by the computer. The computer determines that the keypoints 202 are occluded and records that a facial touch has occurred on the left side of the face.

Figure 4A:
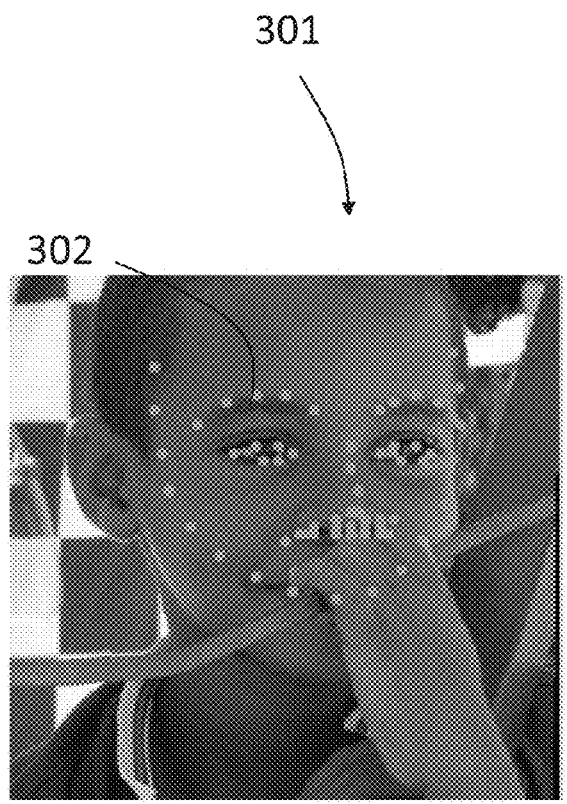
Figure 4B:
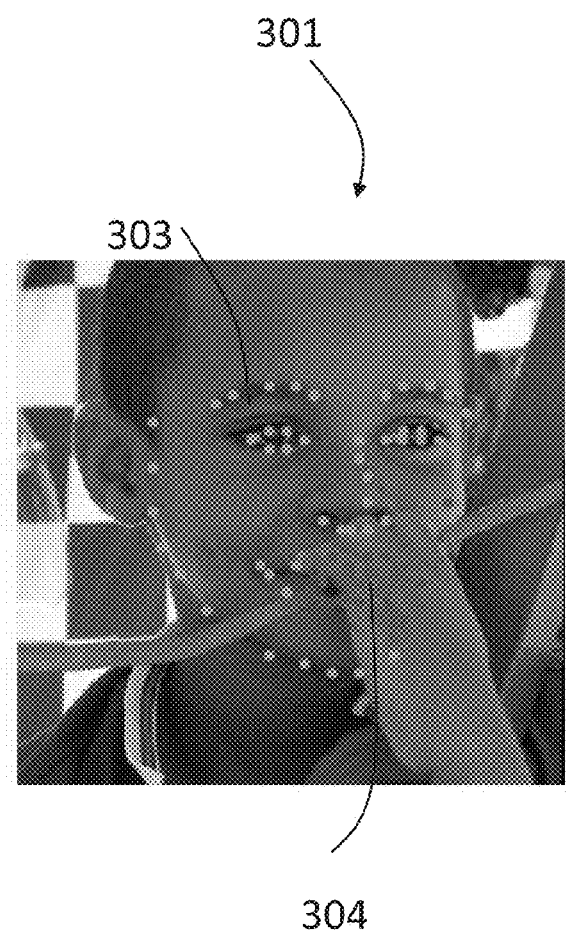

FIGS. 4A-4B depict another example of depiction of partial facial occlusion based on keypoint recognition. In FIG. 4A, image 301 shows facial keypoints 302 of a reference image for the user. The user is touching a central portion of his mouth. In FIG. 3B, the unobscured facial keypoints 303 are shown in green, and the facial keypoints 304 that are obscured by the user's hand are shown in red. The computer may record which facial keypoints are obscured and thereby determine the location of the facial touch.

In addition or alternatively, the computer may determine that a facial touch has occurred by using a detection score algorithm, as described above. The program may continually apply the detection score to the area previously determined to be a face. The computer may conclude that a facial touch has occurred when the detection score is lowered below a predetermined threshold, e.g., below 90% or below 99%.

In addition or alternatively, the computer may run a full biometric face comparison of an imaged frame, compared to the reference image of the known person obtained in step 102. The computer may assign a match score to the currently imaged face compared to the reference image. A sudden decrease in match score, when the orientation of the face is otherwise legitimate, would indicate a hand or another potential foreign object touching the face.

As shown in FIGS. 5A-5C, the computer may also apply a skeletal pose estimation technique to track movements of the user's hand relative to the user's face. A skeletal pose represents the orientation of a person in a graphical format. The computer generates a set of coordinates that can be connected to describe a person's pose. Each coordinate in the skeleton is represented as a part, or a keypoint. A valid connection between two parts is known as a pair, or a limb. The computer uses a deep learning algorithm to compare sequential images and thereby track the relative movement of each limb. For example, in FIG. 5A, keypoints in the user's body are detected and mapped as red dots. From these detected keypoints, a smaller number of keypoints are selected and used to generate limbs, which are depicted in green.

In the skeletal pose estimation depicted in FIGS. 5B and 5C, the central limbs of the user's body are depicted in blue, the limbs on the right side are depicted in green, and the limbs on the left side are depicted in red. The computer tracks movement of the green and red keypoints relative to the blue keypoints. The computer may determine that a facial touch has occurred when a keypoint associated with a hand comes into close proximity with a keypoint associated with the face. This determination may take place even when the user's back is to the camera. For example, in FIGS. 5B and 5C, a user is touching his face with his right hand, and, correspondingly, a green keypoint comes into close proximity with a blue keypoint. The locations of the green and blue keypoints are used to estimate the location of a facial touch.

Skeletal pose estimation may be used not only to detect an actual facial touch, but also to predict an impending facial touch movement. For example, the computer may detect a raising of the hand relative to the collarbone, or the bending of the elbow, and determine that a facial touch is likely to occur imminently.

Turning back to FIG. 2A, at step 104, the computer updates a dataset documenting a plurality of facial touch event frequencies of a plurality of facial touch events in a plurality of facial locations. Each of the plurality of facial touch events is prompted by a previously captured hand-to-face gesture of the user. The dataset may include information such as frequency of touches measured within a particular time frame; location of touches; hand used for each touch; and duration of touches.

At step 105, the computer repeats the previous steps as desired. The computer may be preset to operate for a fixed period of time, for example, an hour. Alternatively, the image sensor or computer may be turned on and off manually. In another example, a program may run continuously on a user's laptop computer while the user is working.

At step 106, a presentation is generated on the display based on at least some of the determined facial touch event frequencies. The presentation may include data about the facial touches. The data may be presented, for example, in a tabular, graphical, or pictorial format. A pictorial presentation may include, for example, a display of facial keypoints, with touched areas in a different color than untouched areas, as shown in FIG. 4B.

As shown in FIG. 6, the presentation about facial touch frequencies may be in the form of a two-dimensional heat map 401. The heat map 401 may show an image of a face, which different colors gradients of colors on facial locations representing different facial touch frequencies. For example, in the illustrated embodiment, clear represents no facial touches, light green represents a first level of frequencies, darker green represents a higher frequency, orange represents an even higher frequency, and red represents the highest frequency. The user may review the heat map 401 to ascertain which areas of the face he or she touches the most, and thus focus on inhibiting facial touching in those areas.

The presentation may also include a ranking or grading of touch events, based on severity of the touch. The severity level of each facial touch may be selected based on likelihood of inoculation of a pathogen from that touch. For example, touching with the fingertips may be deemed a more severe form of touching compared to touching with the back of the hand or with the forearm. Likewise, a longer touch may be deemed more severe than a shorter touch.

The presentation may also provide feedback regarding proximity of facial touching to other events. The other events may include, for example, activities that may have caused pathogens to be passed onto the user's hands. For example, the presentation may show that the user touched his or her face within two minutes of eating, or within a certain time period following return from a public area, e.g., a cafeteria, lounge, or public toilet.

Referring now to FIG. 2B, steps for training a plurality of persons regarding facial touches are presented. Steps 111-116 are similar in most respects to steps 101-106 of the flow chart of FIG. 2A, and the discussion above of steps 101-106 applies as well to steps 111-116. The main difference is that steps 111-116 are performed for a group of users rather than a single user. In addition, because the training of the group of persons may be facilitated by an instructor, the steps depicted in FIG. 2B need not be performed with a display.

At step 111, the image sensor receives a sequence of images from a plurality of users. At step 112, the computer detects faces of each of the users and generates reference facial images. At step 113, the computer analyzes images of the users and/or the users' skeletal poses to detect hand-to-face gestures. At step 114, upon detecting a facial touch, the computer updates a dataset documenting the frequency of facial touch events. The dataset includes information about facial touches for all of the users.

At step 115, the previous steps are repeated as desired. In an instructor-facilitated setting, the instructor may manually turn on and off the image sensor, as desired for effective training.

The instructor may further implement creative techniques for enriching the users' educational experience. For example, the instructor may instruct the users to play games, or otherwise engage in certain activities, such as touching a keyboard, clapping hands, waving hands, etc. During all of these activities, the system is able to monitor whether the users are touching their faces.

At step 116, the computer generates a presentation scoring the plurality of users. The presentation includes a comparison of the facial touch frequencies of each of the users. The presentation may include, for example, a score for each user, or a ranking of each of the user's ability to prevent facial touching relative to the others. An instructor, if desired, may issue grades to each user. The presentation may also incorporate data regarding severity of facial touches, and with regard to proximity of facial touches to other events, as discussed above in connection with step 106.

In addition, each user may have a terminal in front of him or her, and the computer may forward to each of the terminals a real-time notification of a respective hand-to-face gesture. The real time notification may be, for example, textual, visual, or auditory. Optionally, the real time notification may include an image of a destruction event prior to completion of an impending facial touch, as will be discussed with reference to FIG. 7, below. In such a scenario, the group learning experience thus constitutes an individualized component, based on the presentation on each user's personal terminal, as well as a collective component, based on the score or ranking.

In scenarios when the score or ranking is shown on a display, the terminal may also be used to display the presentation on the display, albeit with an emphasis on that particular user's performance. For example, each terminal may display results associated with the user that is in front of it in bold text or in a text of a different color. The terminal may also display a heat map showing facial touch frequencies of the associated user.

Referring now to FIG. 2C, another method for adapting a display to illustrate facial touches is represented. FIG. 7 illustrates a user-directed display that may be generated during performance of this method.

At step 121, a computer receives a sequence of facial images of one or more users. At step 122, the computer detects a face and generates a facial image for each of the users. Steps 121 and 122 are performed using the same techniques as steps 101 and 102 and 111 and 112, discussed above.

At step 123, the computer analyzes the sequence of facial images and detects an initiation of an impending hand-to-face gesture of a user. To detect the impending hand-to-face gesture, the computer may use the techniques and algorithms discussed in connection with step 103 above—e.g., determination of occlusion of facial keypoints, or skeletal pose estimation.

At step 124, the computer instructs presentation of a destruction event on the display in real time, before the user completes the hand-to-face gesture. The destruction event may be a standalone image or may be superimposed on an image of the face. For example, in the image displayed in FIG. 7, an explosion 501 is superimposed on an image of a user's face 502, in a location that the user is about to touch, or that the user frequently touches. The user may view the destruction event and remember to refrain from completing the hand-to-face gesture. Optionally, the computer may be programmed to display a destruction event only for impending touches of the eyes, nose, throat, or inner ear, which are more susceptible for inoculation of pathogens, but not for impending touches of the cheeks or chin.

The system and methods described herein may be integrated with accelerometry data collected by an accelerometer. For example, image data may be used for mapping and recording accelerometer patterns recorded with a smart watch containing an accelerometer.

In addition, the images collected by the image sensor may be integrated with images obtained by a wearable camera, e.g., a camera on a smart watch or a body camera.

It is expected that during the life of a patent maturing from this application many facial keypoint detection and skeletal pose estimation techniques and algorithms will be developed that are suitable for the functions described herein, and the scope of the terms facial keypoint detection and skeletal pose estimation is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of adapting a display, comprising:
    receiving a sequence of a plurality of facial images of a face of a user located in front of a display;
    analyzing the plurality of facial images to detect a hand to face gesture of the user;
    updating, according to the hand to face gesture, a dataset documenting a plurality of facial touch event frequencies of a plurality of facial touch events in a plurality of facial locations, each of the plurality of facial touch events is prompted by one of a plurality of previously captured hand to face gestures of the user; and
    based on at least some of the plurality of facial touch event frequencies generating a presentation on the display;
    further comprising continuously detecting at least one of:
    (1) the face of the user when a detection score is above a threshold; wherein the hand to face gesture is detected when the detection score is decreased below the threshold, and
    (2) a presence of a first and a second facial keypoint in frames of the sequence; wherein the hand to face gesture is detected when a detection of the first facial keypoint stops while the detection of the second facial keypoint is maintained.

2. The method of claim 1, wherein the presentation comprises a heatmap mapping the plurality of facial touch event frequencies in a two dimensional space.

3. The method of claim 1, wherein the presentation includes a ranking of facial touch events based on one or more of location of facial touches on the user's face, duration of facial touch events, part of the user's body that comes into contact with the user's face, or proximity of facial touch events to other activities by the user.

4. The method of claim 1, wherein the plurality of facial locations comprises at least an eye area, lips area, nose area, and inner ear area.

5. The method of claim 1, wherein the hand to face gesture is detected when at least one of the plurality of facial locations is covered by at least one finger of the user.

6. The method of claim 1, further comprising applying a skeletal pose estimation to track a hand of the user; wherein the outcome of the skeletal pose estimation is used for detecting the hand to face gesture of the user.

7. The method of claim 1, wherein the plurality of facial images are captured by a webcam.

8. A method of training a plurality of persons regarding facial touches, comprising:
    receiving a sequence of a plurality of images of a plurality of faces of the plurality of persons;
    analyzing the plurality of images to detect a plurality of hand to face gestures of the plurality of persons;
    updating, according to the according to the plurality of hand to face gestures, a dataset documenting for each of the plurality of persons a facial touch event frequency of a plurality of facial touch events, each of the plurality of facial touch events is prompted by one of the plurality of hand to face gestures; and
    based on the dataset generating a presentation scoring at least some of the plurality of persons;
    further comprising continuously detecting at least one of:

(1) the face of the user when a detection score is above a threshold; wherein the hand to face gesture is detected when the detection score is decreased below the threshold, and (2) a presence of a first and a second facial keypoint in frames of the sequence; wherein the hand to face gesture is detected when a detection of the first facial keypoint stops while the detection of the second facial keypoint is maintained.

9. The method of claim 8, further comprising forwarding to each of a plurality of client terminals a notification indicative of a respective hand to face gesture in real time.

10. A system comprising:
an image sensor, a display, and a computer;
wherein the computer includes processing circuitry configured to:
receive a sequence of a plurality of facial images of a face of at least one user located in front of the display;
analyze the plurality of facial images to detect a hand-to-face gesture of the user;
update, according to the hand-to-face gesture, a dataset documenting a plurality of facial touch event frequencies of a plurality of facial touch events in a plurality of facial locations, each of the plurality of facial touch events is prompted by one of a plurality of previously captured hand to face gestures of the user; and
based on at least some of the plurality of facial touch event frequencies generate a presentation on the display;

further comprising detecting at least one of:
(1) the face of the user when a detection score is above a threshold; wherein the hand to face gesture is detected when the detection score is decreased below the threshold, and (2) a presence of a first and a second facial keypoint in frames of the sequence; wherein the hand to face gesture is detected when a detection of the first facial keypoint stops while the detection of the second facial keypoint is maintained.

11. The system of claim 10, further comprising a plurality of client terminals, wherein each of the client terminals is associated with one of the at least one users, and the processing circuitry is configured to forward to each of a plurality of client terminals a notification indicative of a respective hand to face gesture in real time.

12. The system of claim 10, wherein the image sensor is configured within a webcam.

13. The system of claim 10, wherein the at least one user is a plurality of users, and the presentation comprises a presentation scoring at least some of the plurality of users.

14. The system of claim 10, wherein the processing circuitry is further configured to:
analyze the plurality of facial images to detect an initiation of a hand to face gesture of a user; and
instruct a presentation of a destruction event on the display in real time, before the user completes the hand to face gesture.

* * * * *